United States Patent [19]
McCue et al.

[11] 3,786,512
[45] Jan. 15, 1974

[54] LOCOMOTIVE INFORMATION RECORDER

[75] Inventors: David D. McCue; Thomas A. Brendle, both of Hamburg, N.Y.

[73] Assignee: Aeroquip Corporation, Jackson, Mich.

[22] Filed: Dec. 4, 1967

[21] Appl. No.: 687,589

[52] U.S. Cl. .............. 346/33 D, 346/118, 346/136
[51] Int. Cl. ............................................ G01d 9/38
[58] Field of Search ................... 346/49, 118, 136, 346/145, 33; 246/185

[56] References Cited
UNITED STATES PATENTS

| | | | |
|---|---|---|---|
| 2,325,451 | 7/1943 | Wait | 246/185 |
| 3,167,777 | 1/1965 | Zagorites et al. | 346/74 |
| 1,405,060 | 1/1922 | Mosley | 346/80 X |
| 2,148,188 | 2/1939 | Chappell et al. | 346/136 |
| 2,153,317 | 4/1939 | Sigo | 346/49 UX |
| 2,342,687 | 2/1944 | Parrish | 346/118 |
| 3,017,770 | 1/1962 | Green | 346/115 X |

*Primary Examiner*—Joseph W. Hartary
*Attorney*—Bean and Bean

[57] ABSTRACT

A permanent record is made of the speed of a locomotive on a linear basis proportional to distance travelled. The record paper drive and the speed indicator drive are derived from a common signal whose frequency and amplitude are proportional to vehicle speed. The mechanism is mounted in a housing having a door. Opening the door interrupts the paper take-up drive while a separate hand operated device, when actuated, restores the take-up drive while terminating the paper speed drive.

6 Claims, 17 Drawing Figures

INVENTORS
DAVID D. McCUE
THOMAS A. BRENDLE

Bean & Bean
ATTORNEYS

LOCOMOTIVE INFORMATION RECORDER

BACKGROUND OF THE INVENTION

In the railroad industry, it is frequently desirable to determine various facts relative to the operation of a locomotive with respect to its particular position at the moment. For example, the speed of the locomotive, the application and release of brakes and various other events desirably would be recorded in such fashion that the location and, in some cases, the magnitude of these events could be determined. The electrical system of this invention is disclosed in our copending application filed concurrently herewith and now U.S. Pat. No. 3,441,943, Apr. 29, 1969.

BRIEF SUMMARY OF THE INVENTION

In the present invention, transducer means provides an output proportional to vehicle speed which output controls a record paper drive so that record paper movement reflects the instantaneous position, from some predetermined starting point, of the locomotive. A recording device is also connected to the output of the transducer to provide a record on the paper of the instantaneous speed of the locomotive. Additional recording devices may be operated to indicate the point at which various other events incidental to the operation of the locomotive have occurred, such as brake application, brake release, etc.

DETAILED DESCRIPTION

Figure 1:
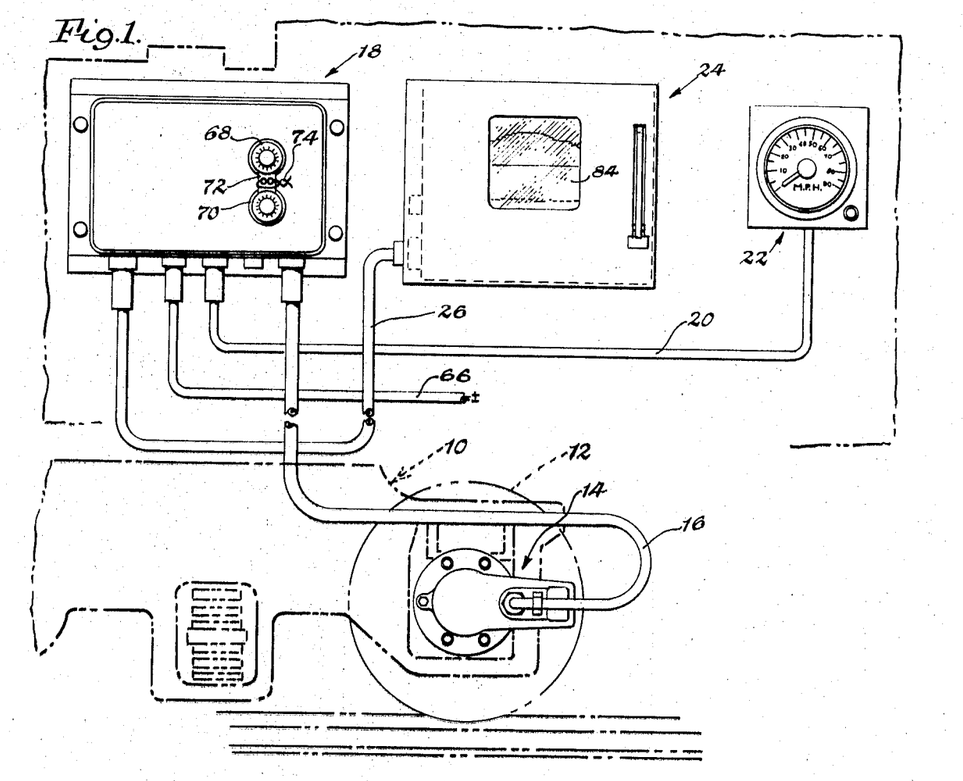
FIG. 1 is a diagrammatic assembly view illustrating the various components of the present system.

Referring now more particularly to FIG. 1, a locomotive truck 10 is indicated in phantom lines and one of its supporting wheels is indicated by the reference character 12. Associated with this wheel 12 as will be more clearly apparent hereinafter, is a speed pick-off device indicated generally by the reference character 14 which supplies an A.C. signal through a suitable cable 16 to the unit 18. The A.C. signal is of a frequency and amplitude proportional to vehicle speed and the unit 18 includes mechanism for converting this A.C. signal to a direct current signal which is applied through cable 20 to a speedometer 22 and the unit 18 also controls the recording unit 24 in such fashion as to drive the paper record therein at a rate proportional to vehicular speed and also to actuate a stylus in proportion to the vehicular speed so as to provide a visual record on the paper. Since the paper is travelling at a rate proportional to vehicular speed, the stylus record may be interpreted in terms of distance travelled so that the speed of the locomotive at any position along the track can be determined by reading the paper record. The record paper drive and vehicular speed stylus drive are supplied by signals passing through the cable 26.

Figures 2, 3:
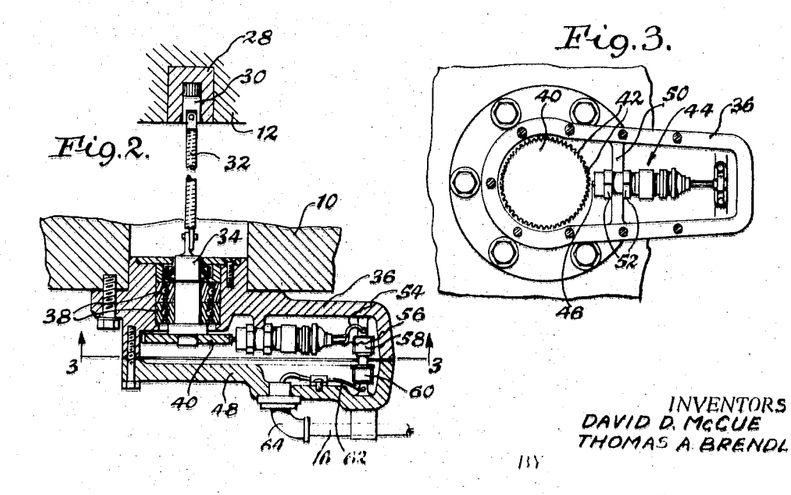
FIG. 2 is an enlarged horizontal section taken through the locomotive wheel speed pick-off.
FIG. 3 is a view of the pick-off taken substantially along the plane of section line 3—3 in FIG. 2.

The pick-off assembly 14 can be seen best in FIGS. 2 and 3. As shown in FIG. 2, the locomotive wheel 12 is provided with a drive member 28 which receives a splined stub shaft 30 connected by means of a drive cable 32 to a spindle 34. The spindle 34 is carried by a housing 36 as by means of suitable bearings 38 and has affixed thereto a sending head 40. The sending head may be in the form of a gear having, as shown in FIG. 3, a number of teeth 42, and a magnetic pick-up head 44 is supported in the housing 36 in close adjacency to the teeth 42 so that as the sending head 40 is rotated, the teeth 42 thereof pass successively in close proximity to the magnetic pick-up member 46 so as to induce a variable current therein whose frequency is, of course, directly related to the rotational speed of the sending head 40 and hence of the rotational speed of the locomotive wheel 12. Suitable mountings for the cable 16 are provided by the cover 48 for the housing 36.

The pick-up head 44 and its details of construction form no part of the present invention. The head, however, is suitably mounted in a saddle portion of the web 50 integral with the housing 36 and lock-nut members 52 serve to retain the head 44 in proper position. As can be seen best in FIG. 2, conductors 54 and 56 from the head 44 lead to and are connected with a suitable coupling device 58 which mates with a further connector 60 in electrical contact therewith when the cover 48 is secured to the housing main body 36 and further conductors 62 lead from the connector 60 for disposition within the cable 16 previously mentioned through an elbow 64 or the like, substantially as is shown.

The details of the converting unit 18 likewise form no part of the present invention. Suffice it to say that the unit 18 is capable of converting the variable frequency and amplitude signal produced by the head 44 to signals transmitted through the previously mentioned cable 26 to the recording unit 24 and over the cable 20 to the speedometer or speed indicating device 22. The unit 18, further, may receive additional signals as over a cable 66 as shown in FIG. 1 which applies signals through the cable 26 for making additional records as will be more readily apparent hereinafter. In addition to the above functions, the unit 18 includes the electrical mechanism controlled by the two knobs 68 and 70, one of which functions to accommodate for variations in the diameter of the wheel 12 which drives the member 40 and the other of which functions to produce a signal in the event that the locomotive exceeds a certain predetermined speed. These knobs 68 and 70 are adjustable and when properly adjusted, are suitably locked as by the member 72 which may be provided with a seal 74 to prevent tampering.

Of principal concern herein is the unit 24 which, as can be seen best from FIGS. 4-10, consists of a housing 18 provided with a door or cover 82 having a window 84 therein, see also FIG. 1.

Figure 4:
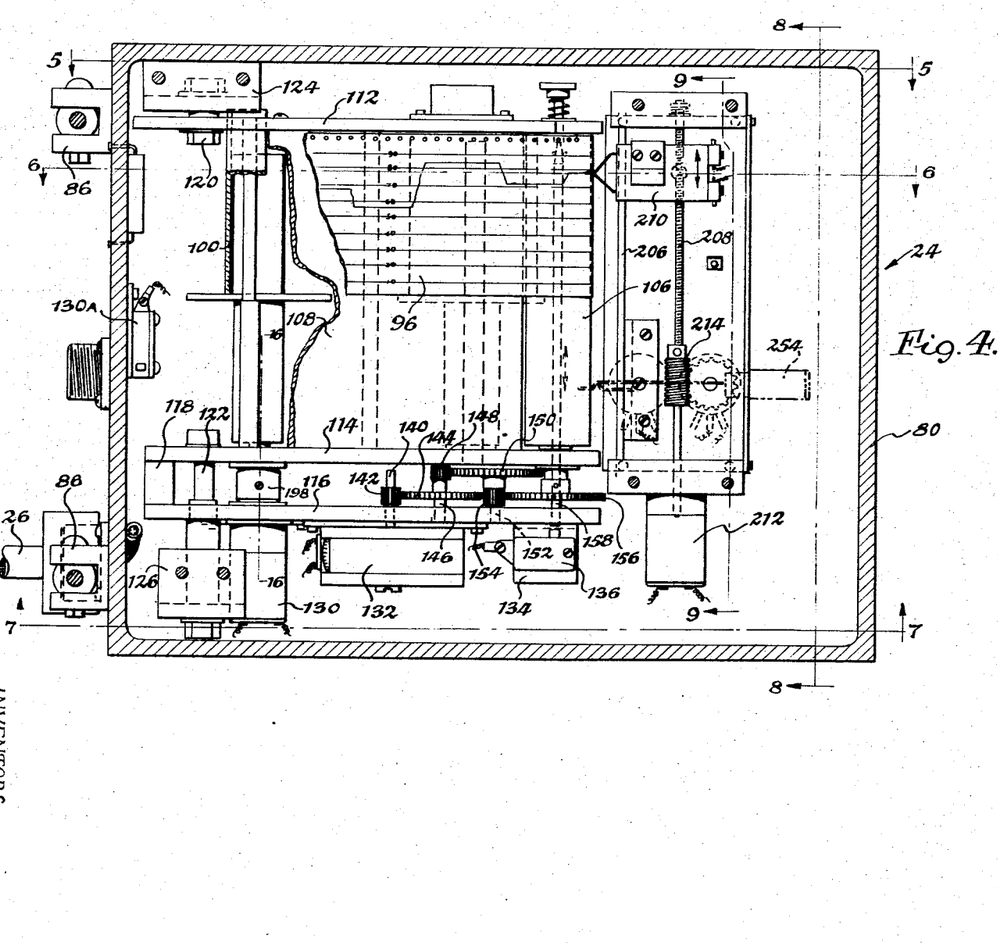
FIG. 4 is a vertical section taken through the paper record assembly.
Figure 5:
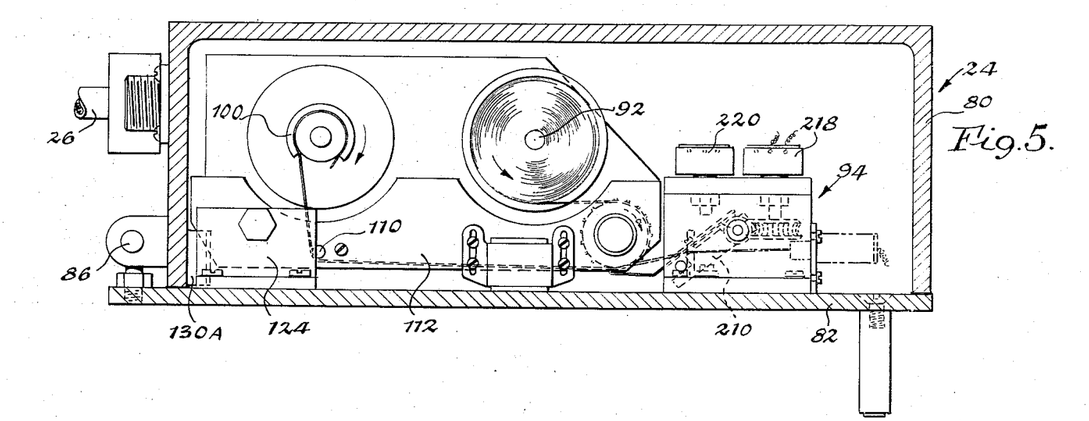
FIG. 5 is a horizontal section taken substantially along the plane of section line 5—5 in FIG. 4 and showing certain details of the paper drive mechanism and of the stylus mechanism.
Figure 6:
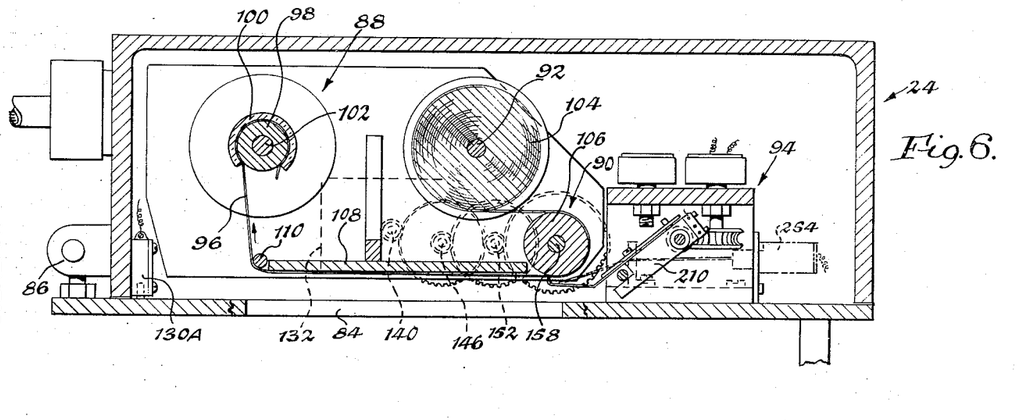
FIG. 6 is a horizontal section taken substantially along the plane of section line 6—6 of FIG. 4 showing further details of the stylus mechanism.
Figures 10, 11, 12, 13:
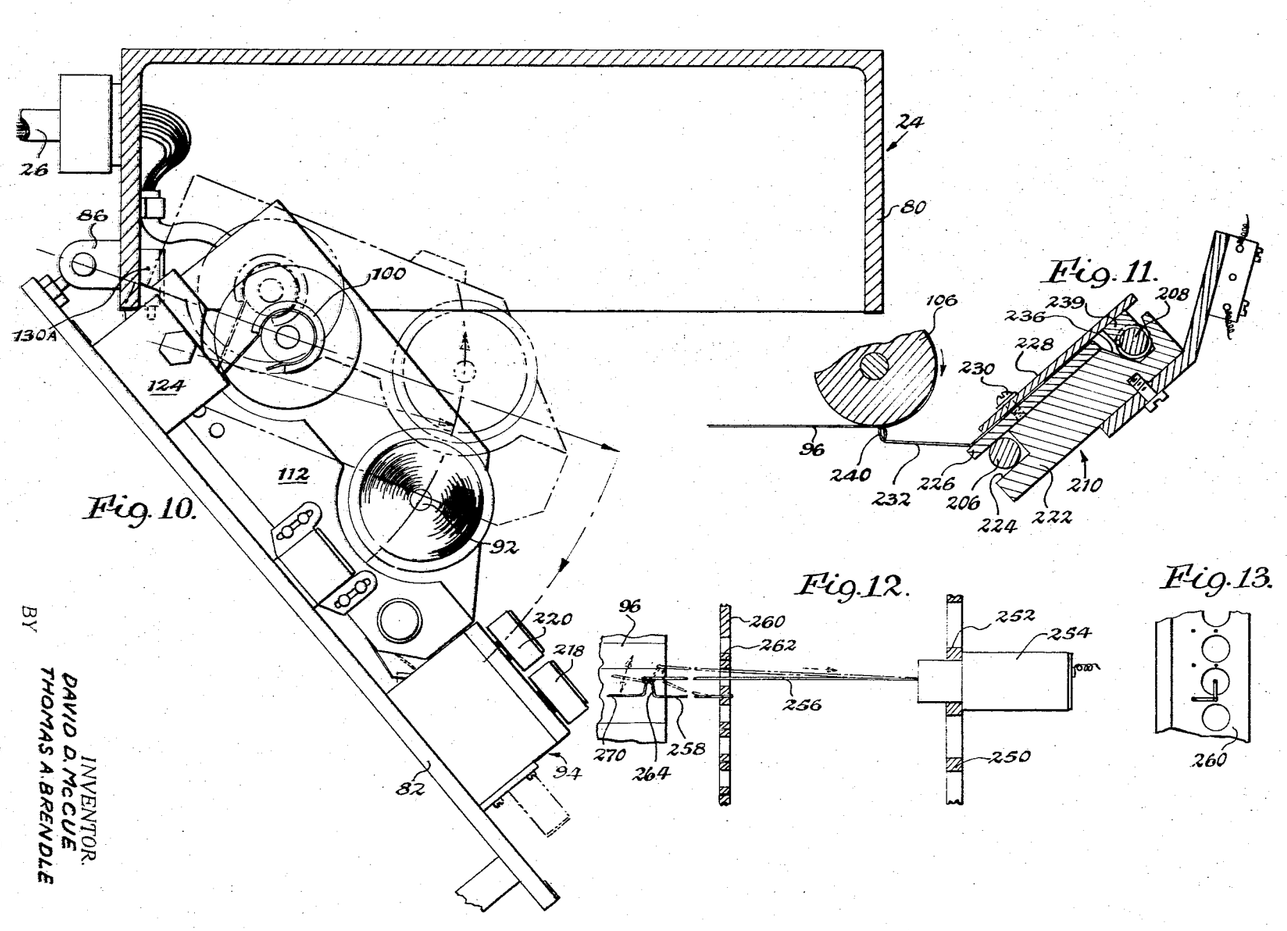
FIG. 10 is a plan view of the record device illustrating same in access position.
FIG. 11 is an enlarged partial section illustrating relative disposition between the stylus mounting and the paper mechanism.
FIG. 12 is an enlarged vertical section taken through the stylus mounting assembly and illustrating the manner in which additional events may be recorded.
FIG. 13 is an end view of the assembly shown in FIG. 12.

The door 82 is mounted by hinge means 86 to the body 80 and is adapted to be swung outwardly therefrom in the fashion indicated best in FIG. 10. As can be seen in FIG. 6, the essential component parts within the unit 24 consist of a take-up drum 88, a drive drum 90, a paper supply spindle 92 and the stylus assembly indicated generally by the reference character 94. The recording paper 96 is engaged upon the drum 98 of the take-up 88 by means of a C-shaped collar 100, the drum 98 being driven by the shaft 102 as will be more readily apparent hereinafter. The paper roll supply 104 is mounted on the stationary spindle 92 and issues therefrom to pass over the drive drum 106 whence it passes in front of the plate 108, over a guide spindle 110 for reception upon the take-up assembly 88 substantially as is shown. These entities are all mounted on a common support assembly which, as shown in FIG. 4, consist of the upper and intermediate plates 112 and 114 respectively interconnected by the aforementioned vertical plate 108 and this support assembly also includes the lower plate 116 fixed to the intermediate plate 114 and by the member 118. This entire unit is pivotally mounted on the door assembly 82 and, for this purpose, there is provided an upper pintle 120 associated with the upper plate 112 and the lower pintle 122 associated with the intermediate and lower plates 114 and 116, substantially as is shown and these pintles are received by mounting bracket assemblies 124 and 126 secured to the door 82. Thus, the door may be swung open as shown in FIG. 10 and the support unit with entities attached thereto may be swung pivotally away from the door as is shown in phantom lines in FIG. 10.

The lower plate 116 mounts a take-up motor 130 in depending relation thereto, a drive motor 132 and also mounts a bracket 134 upon which the microswitch 136 is mounted, the purpose of which will be presently apparent.

The stepping drive motor 132 includes a drive shaft 140 projecting through the lower plate 116 and carrying a pinion 142 thereon. This pinion 142 is in mesh with a gear 144 carried by a shaft 146 mounted on the plate 116 and a further gear reduction is achieved through the pinion 148 on the shaft 146 in mesh with the gear 150 on the shaft 152 also carried by the plate 116. A final gear reduction is established between the pinion 154 and the gear 156, the gear 154 being mounted in common with the gear 150 and the gear 156 being mounted on the drive shaft 184. The stepping motor 132 is intermittently driven in accord with the distance travelled by the locomotive as obtained by the signal from the pick-up head 44 and converted in the unit 18 to suitable pulses indicative of the distance travelled. The drive drum 106 therefore is driven in step-by-step fashion and in order to accurately control the movement of the record paper 96, a pin wheel drive element 170 is provided, see particularly FIG. 14. The take-up motor 130 is constantly energized when the device is operating so as to maintain the record paper taut between the paper drive drum 106 and the take-up spindle but, as will hereinafter appear, take-up action is interrupted when the door of the unit is opened and may be energized selectively for removing the record.

Figure 14:
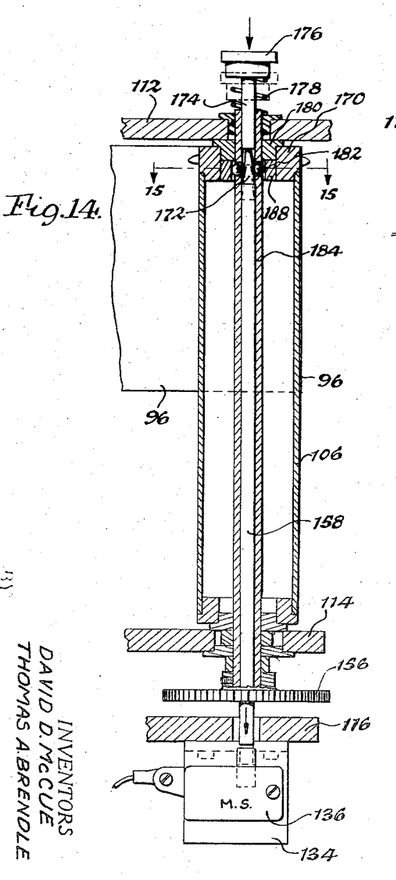
FIG. 14 is an enlarged vertical section taken through the paper supply roll.

FIG. 14 also illustrates the manner in which drive is transmitted to the pin wheel 170 and the drum 106. The clutch control shaft 158 is slidable in the tubular drive shaft 184 and is provided with a tapered portion 172 adjacent its upper end, the upper extremity 174 of the shaft 158 having an enlarged head portion 176 which is seated upon the compression spring 178 bearing at its lower end against the collar 180 received in the pin wheel 170. By virtue of the action of the spring 178, the shaft 158 is constantly urged upwardly so that the tapered portion 172 thereof bears against the ball members 182 (see also FIG. 15) which are caged in suitable openings in the tube 184 and normally seat tightly within the recesses 186 of the drive collar 188. Thus, a firm connection is normally established between the drive shaft 184 and the drum 106 but this drive may be disabled by manually depressing the enlarged head 176 as indicated by the arrow in FIG. 14 to thus slightly shift the shaft 158 downwardly and this action also operates the microswitch 136. The microswitch 136 energizes the take-up motor 130 so that, in this fashion, the record paper may be released from control by the gear train and freely flows to the take-up spindle enabling the record under the stylus to be moved to the take-up spindle for removal. In FIG. 4, switch 130A deenergizes take-up motor 130 when door 82 is opened. This permits the record to be removed from the drum 98 so that fresh paper may be clamped onto the drum 98 via clamp 100.

Figures 15, 16, 17:
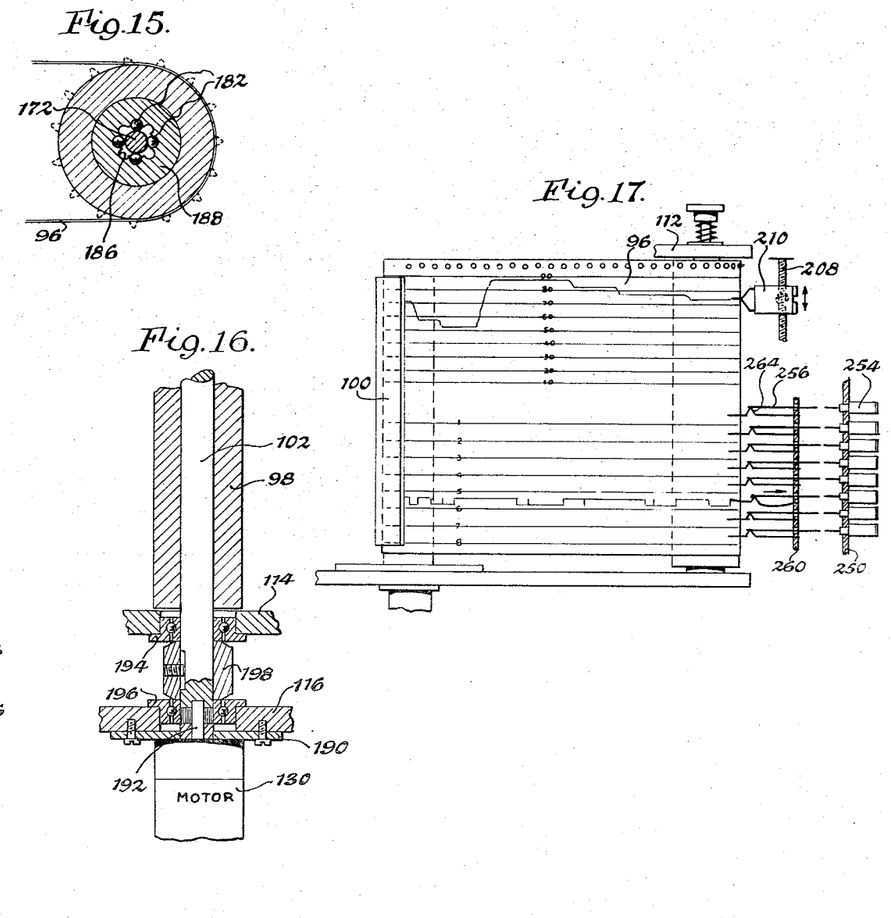
FIG. 15 is an enlarged horizontal section taken along the plane of section line 15—15 in FIG. 14 and illustrating the clutch mechanism.
FIG. 16 is an enlarged vertical section taken through a portion of the paper drive roll.
FIG. 17 is a view of a recording paper assembly and diagrammatically illustrating a plurality of styluses which may be associated therewith.

The drive to the take-up assembly 88 and more especially to the drum 98 thereof, is shown best in FIG. 16. As illustrated, the motor 130 is mounted by a suitable flange 190 on the underside of the plate 116 and its drive shaft 192 is coupled to the take-up drive shaft 102. These shafts are rotatably supported in the plates 114 and 116 by bearings 194 and 196 having a suitable spacer 198 associated therewith.

Figures 7, 8, 9:
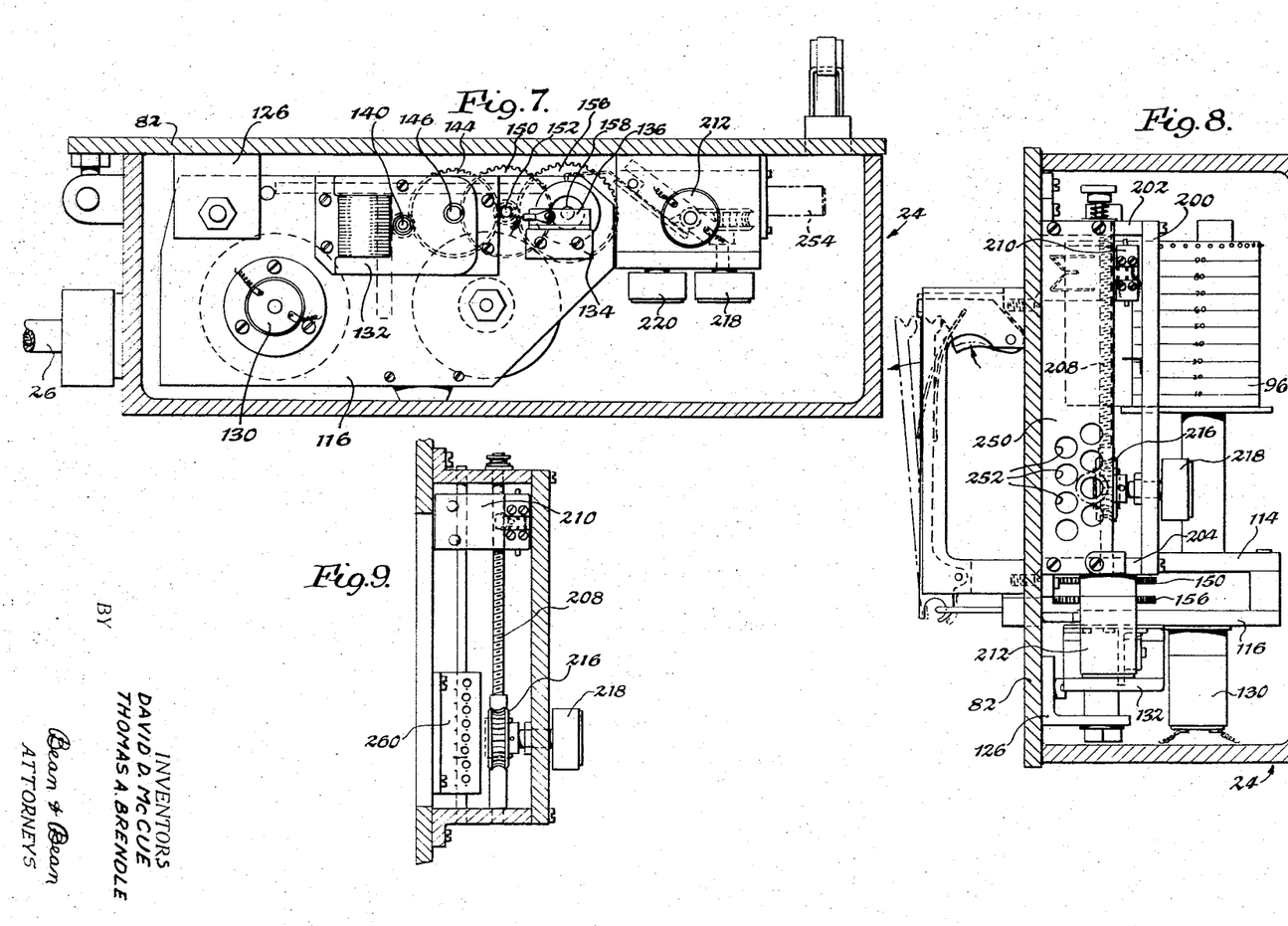
FIG. 7 is a horizontal section taken substantially along the plane of section line 7—7 of FIG. 4 showing further details of the paper drive.
FIG. 8 is a vertical section taken substantially along the plane of section line 8—8 in FIG. 4 showing further details of the stylus and paper drive and illustrating also means by which further styluses may be mounted.
FIG. 9 is a vertical section taken substantially along the plane of section line 9—9 in FIG. 4 illustrating details of a stylus feed mechanism.

The stylus assembly is attached directly to the rear side of the door 82 and includes a frame member 200 as is shown in FIG. 8 attached by frame members 202 and 204 to the rear side of the door, as aforesaid. Fixed between the upper and lower members 202 and 204 is a guide bar 206, see particularly FIG. 4 and journalled between these same members is a lead screw member 208. A stylus carriage 210 engages the guide bar 206 and the lead screw 208 and is adapted to be positioned vertically proportional to the speed of the locomotive. For this purpose, the lead screw 208 is rotatably driven by a stylus motor 212 in the appropriate direction dependent upon changes of speed in the locomotive. The lead screw 208 also has a worm 214 fixed thereto and this worm engages a worm wheel 216 (see particularly FIG. 9) which rotates a potentiometer 218 for electrical control purposes which forms no part of the present invention. For the sake of convenience, a further potentiometer 220 is mounted adjacent the potentiometer 218 and it, like the potentiometer 218, forms no part of the present invention, suffice it to say it forms a portion of the electrical control circuitry for the device.

As can be seen in FIG. 11, the speed recording stylus carriage 210 includes the plate 222 having a notch 224 receiving the guide rod 206 and carrying a plate 226 cooperative with a notch to provide a straddling engagement with the member 206, as shown. A clamping plate 228 is attached as by fasteners 230 to the plate 226 and holds the stylus wire 232 in place. The plate 228 also carries a nut 234 which has screw-fitted engagement with the lead screw 208. With regard to this arrangement, it will be noted that the plate 222 has the groove 236 therein which receives the lead screw 208 and that the nut 234 bears against the lead screw 208 and retains it in oriented position within the groove 236. Thus, by simply removing the clamping plate 228, the entire assembly may be disengaged from both the guide bar 206 and the lead screw 208 and removed for servicing or replacement as desired.

The stylus wire 232 has a looped end portion 240 which bears against the paper 96 and presses it against the cylinder 106. The paper 96 is pressure-sensitive so as to be marked by the pressure of the stylus loop 240. As the paper is moved in accord with the distance travelled by the vehicle and the stylus is vertically positioned with respect to the instantaneous vehicular speed, the record produced on the paper indicates the vehicular speed at the various positions along its route.

In addition to the speed record, it may be desirable to record the occurrence of various other events such as the actuation of the sander, application and release of brakes etc. For this reason, provision is made for the utilization of additional styluses and this takes the form of a mounting plate 250 as is shown in FIG. 8 provided with a series of openings 252 which allow for the mounting solenoids 254, see particularly FIG. 12, each of which has a reciprocable armature 256 connected to an associated stylus 258. Each of the additional styluses 258 is mounted in cantilever fashion from a suitable mounting plate 260 (see also FIG. 9). The plate 260 is provided with holes 262 through which the various armatures 256 pass and each stylus 258 is provided with a laterally looped portion 264 to which the respective armature 256 is attached. The hole 262 associated with each armature 256 and with respect to its associated stylus 258 is located above the stylus and the loop 264 of the stylus projects upwardly so that as the armature 256 is withdrawn by actuation of the solenoid 254 the tip 270 of the stylus will be moved upwardly as is indicated in phantom lines in FIG. 12. The styluses 258 are in pressure engagement with the paper 96, pressing it against the cylinder 106 so that actuation of the associated solenoid 254 as described will cause a vertical line or step to appear in the record scribed by the associated stylus 258, thus to clearly indicate the initiation of an event. When the stylus is allowed to swing back down to its normal position, the termination of the event will be recorded.

We claim:

1. In a recording system for locomotives, in combination,
a record paper system including drive means for moving a record paper linearly in proportion to the distance travelled by the locomotive,
recording means for producing a visual record upon the record paper indicating the speed of the locomotive,
and transducer means for actuating both said drive means and said recording means whereby the distance travelled and locomotive speed records cooperatively produced thereby stem from a common signal source, said transducer means having a single output signal proportional to locomotive speed connected to both said drive means and said recording means, said record paper system comprising a take-up spindle, a supply spindle and a drive drum between said take-up and supply spindles, all mounted on a common support, a take-up motor normally operating said take-up spindle to maintain paper issuing from said supply spindle against said drive drum and taut between said take-up spindle and said drive drum, said drive means comprising a stepping motor connected to said drive drum and connected to said transducer means for allowing the paper to advance linearly, under the action of said take-up motor, in accord with the distance travelled by the locomotive.

2. In the recording system as defined in claim 1 wherein said recording device includes a screw shaft parallel to said drive drum, a nut engaged on said screw, a stylus carried by said nut for engaging record paper passing over said drive drum, a servo-motor for driving said screw and connected to the output of said transducer means to locate said nut according to locomotive speed.

3. In a recording system for locomotives, in combination,
transducer means having an output proportional to locomotive speed,
a record paper system including a drive motor connected with the output of said transducer means to move a record paper linearly in proportion to the distance travelled by the locomotive,
a recording device for producing a visual record upon the record paper, said recording device being connected with the output of said transducer means for recording the speed of the locomotive, said record paper system comprising a take-up spindle, a supply spindle and a drive drum between said take-up and supply spindles, all mounted on a common support, a take-up motor normally operating said take-up spindle to maintain paper issuing from said supply spindle against said drive drum and taut between said take-up spindle and said drive drum, said drive motor being connected to said drive drum and connected to said transducer means for allowing the paper to advance linearly, under the action of said take-up motor, in accord with the distance travelled by the locomotive, a housing, said common support means being pivotally mounted within said housing, a door normally closing said housing and urging said common support to a predetermined position therein, and switch means actuated by said door for deenergizing said take-up motor when the door is open.

4. In the recording system according to claim 3 including means for simultaneously interrupting drive between said drive motor and said drive drum and energizing said take-up motor when said door is open.

5. In a recording system for locomotives, in combination, transducer means having an output proportional to locomotive speed, a record paper system including a drive motor connected with the output of said transducer means to move a record paper linearly in proportion to the distance travelled by the locomotive, a recording device for producing a visual record upon the record paper, said recording device being connected with the output of said transducer means for recording the speed of the locomotive, said record paper system comprising a take-up spindle, a supply spindle and a drive drum between said take-up and supply spindles, all mounted on a common support, a take-up motor normally operating said take-up spindle to maintain paper issuing from said supply spindle against said drive drum and taut between said take-up spindle and said drive drum, said drive motor being connected to said drive drum and connected to said transducer means for allowing the paper to advance linearly, under the action of said take-up motor, in accord with the distance travelled by the locomotive, said drive motor being connected to a tubular drive shaft, said drive drum being rotatably mounted concentrically of said drive shaft, a clutch shaft slidably received in said drive shaft and having a tapered portion therewithin, clutch elements carried by said drive shaft in the region of said tapered portion of the clutch shaft, and spring means biasing said clutch shaft to force said clutch elements against said drive drum.

6. In the recording system according to claim 5 including switch means actuated by said clutch shaft in response to axial shifting thereof to release said clutch elements for energizing said take-up motor.

* * * * *